3,514,207
DEVICE FOR DETERMINING THE DISPLACE-
MENT OF A REFLECTING MOVABLE OB-
JECT RELATIVE TO A FIXED OBJECT WITH
THE USE OF AN OPTICAL MASER
Hendrik de Lang, Gijsbertus Bouwhuis and Eric Tapley
Ferguson, Emmasingel, Eindhoven, Netherlands, as-
signors, by mesne assignments, to U.S. Philips Corpora-
tion, New York, N.Y., a corporation of Delaware
Filed Aug. 30, 1966, Ser. No. 576,010
Claims priority, application Netherlands, Sept. 9, 1965,
6511751
Int. Cl. G01n 21/40; H01s 3/02
U.S. Cl. 356—116                                6 Claims

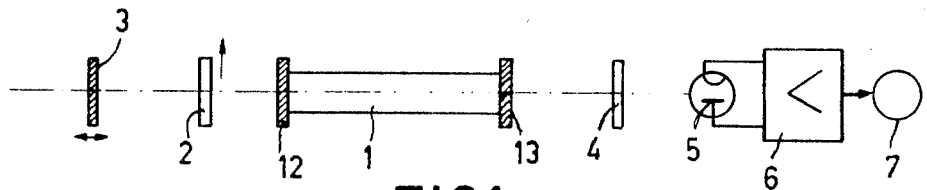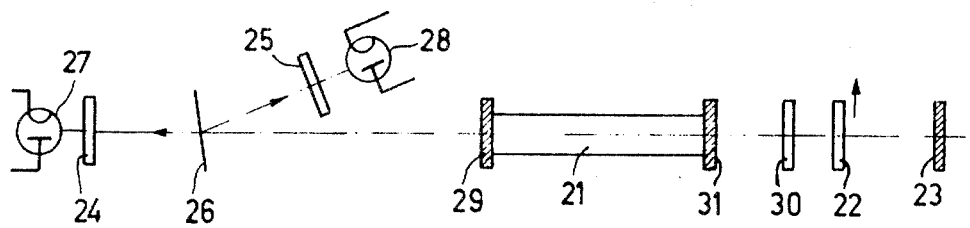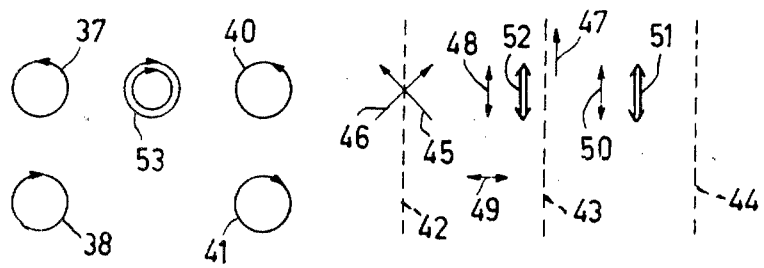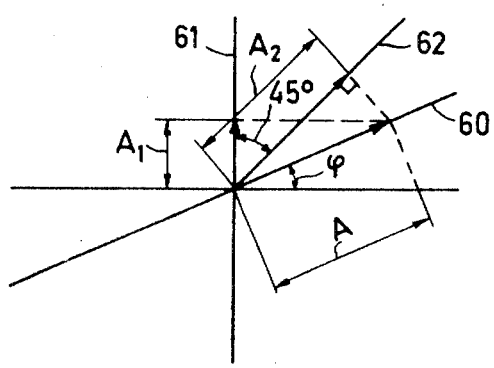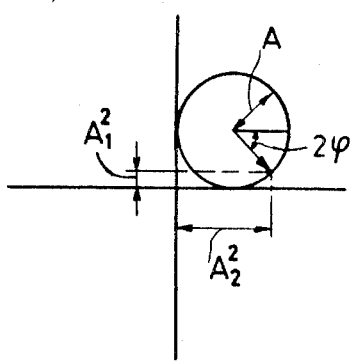

ABSTRACT OF THE DISCLOSURE

An isotropic optical maser for generating a polarized wave with an indefinite plane of orientation is optically coupled to a moving object and a photo cell with a polarizer mounted in the beam path. Movement of the object results in discontinuous shifts of the polarization which is transduced by the photo cell into usable signals.

The invention relates to a device for determining displacement and more particularly to a device employing an optical maser for determining displacement of a movable reflecting object with respect to a relatively fixed point.

An optical maser is a device which generates electromagnetic radiation in the infrared and optical frequency ranges of the electromagnetic spectrum and, in basic form, comprises a radiation generating active medium optically enclosed by two reflecting members. In displacement measurements, the movable reflecting object is positioned along the radiation path of the active medium. A part of the radiated energy, generated by the maser, is reflected from the object and returned to the medium. A photo-detecting means is coupled to the radiation path for detecting the resulting intensity of the radiation as a measure of the displacement. The intensity is variable because the radiation reflected by the object effectively modulates the radiation emitted by the maser. The intensity is also periodic because the maser output will vary cyclically for each half wavelength movement of the movable object, provided that the displacement of the reflecting object takes place in the direction of the radiation beam.

A disadvantage of the foregoing arrangement is that the intensity of the radiated beam will depend on many extraneous and undesired factors, including supply voltage ripple and noise in the medium. True intensity variation due to object displacement is therefore difficult to accurately distinguish on the detector.

It is therefore the prime object of the invention to provide a displacement determining device employing an optical maser which is relatively insensitive to extraneous noise and undesirable transients.

In accordance with the invention, the device includes an optical maser which is substantially isotropic and is provided with one or more optically anisotropic elements being arranged between one of the reflecting end faces of the maser and the reflecting movable object.

An optical maser is isotropic if it contains only optically isotropic elements or elements having neutralizing anisotropies. As a result of this isotropy, the polarization plane of the radiation emitted by the maser will show no preferred direction. The present invention therefore recognizes that an isotropic otpical maser as described will emit only linear or substantially linearly polarized light, the position of the plane of polarization being indefinite.

The amplitude, polarization condition and phase of the radiation which is reflected by the movable object will be dependent upon the amplitude, polarization condition, and phase of the radiation propagated toward the object, as well as the optically anisotropic system placed in the radiation path, and on the position of the movable object. Only definite polarization conditions show the periodic recurrence necessary for maser action. These recurrent polarization conditions periodically depend upon the position of the reflecting movable object with a period of half a wavelength. The polarization condition in question is then detected, from which the place of the movable object can be derived.

In order that the invention may readily be carried into effect, it will now be described in greater detail, with reference to the drawing, in which FIG. 1 shows a first embodiment of a device according to the invention, FIG. 2 shows a second embodiment, and FIGS. 3, 4 and 5 are diagrams to explain the operation of the device shown in FIG. 2.

The isotropic optical maser 1 shown in FIG. 1 emits radiation which is polarized linearly or nearly linearly but has no preference for a particular plane of polarization. Dependent upon the phase difference between the radiation which is reflected at the reflector 3 and travels there and back through the polarizer 2 and the radiation reflected at the end 12 of the optical maser 1, the maser 1 will start oscillating with a plane of polarization either parallel to or at right angles to the pass direction of the polarizer 2.

By means of a polarizer 4, the direction of polarization of which is parallel to or at right angles to that of the polarizer 2, the radiation is either passed to the photoelectric cell 5, or is absorbed. When the reflector 3 is displaced the emission will abruptly switch from one direction of polarization to the other, and the photoelectric cell 5 thus receives either a maximum quantity of radiation or substantially no radiation. The radiation is recorded in the instrument 7.

The operation of the device shown in FIG. 1 is as follows:

The oscillations produced by the maser 1 are considered to be resolved in a direction parallel to the direction of polarization of the polarizer 2 in the path of radiation between the maser 1 and the reflecting member 3, and in a direction at right angles to the said direction of polarization. The oscillations in the direction parallel to the direction of polarization of the polarizer 2 are passed by the said element and reflected at the reflecting movable member 3. Through the polarizer 2, which may be, for example, a Polaroid or a Brewster window, the reflected oscillations again enter the optical maser.

Dependent upon the distance between the movable member 3 and the reflecting end face 12 (maser mirror), of the optical maser 1, so dependent upon the phase difference between the oscillation emerging from the maser 1 and the oscillation entering the maser, the wave reflected internally at the maser mirror 12 will either be amplified or be attenuated. In the former case, the oscillation entering the medium has a larger amplitude than the oscillation the direction of oscillation of which is at right angles to the direction of polarization of the polarizer 2. In fact, the parts of the last-mentioned oscillation which emanates through the maser mirror 12 is absorbed by the polarizer 2.

In the latter case, the oscillation entering the medium has an amplitude, which is smaller than the oscillation, the direction of oscillation of which is at right angles to the direction of polarization of the polarizer 2.

A property of an optical maser is that of the various types of radiation, that radiation is produced and suppressed respectively which has the largest and the smallest amplitude respectively at a reflecting end face. (It is to be noted that, in general, an oscillator produces that oscillation which, after having covered the same path a few times in the oscillator, has increased most rapidly in amplitude.)

Consequently, either radiation having a direction of polarization parallel to that of the polarizer 2, or radiation having a direction of polarization at right angles to that of the polarizer emanates from the optical maser 1. If the distance between the reflecting member 3 and the maser mirror 12 varies, the plane of polarization of the emitted radiation varies periodically. The period is half a wavelength of the emitted radiation. It appears that the changing over from one direction of polarization to the other occurs abruptly. In this manner a digital measurement of the displacement of the reflector 3 can be effected.

Instead of a polarizer, for example, a ¼ λ-plate may be used. The operation of this ¼ λ-plate is analogous to that of the polarizer 2 with this difference that after reflection two oscillations emanate from the ¼ λ-plate with a phase difference of 180°. The oscillations reflected at the maser mirror are amplified by one oscillation and attenuated by the other to the same extent.

In the device shown in FIG. 2, a ¼ λ-plate 30, in addition to a polarizer 22, is arranged in the path between the isotropic optical maser 21 and the reflector 23. The main directions of the plate make an angle of 45° with the direction of polarization of the polarizer 22.

The radiation inside the isotropic optical maser 21 may be assumed to be divided into two circularly polarized coherent waves 37 and 38 of equal amplitude and arbitrary mutual phase difference. In FIG. 3, the levorotary wave is denoted by 40, the dextrorotary wave by 41 which emanate through the maser mirror 31.

The waves 40 and 41 are converted in the ¼ λ-plate 30 into two linearly polarized beams, the directions of polarization of which likewise extend at right angles to one another and enclose angles of 45° with the main directions 45 and 56 of the ¼ λ-plate. Because the main directions of the ¼ λ-plate 30 also enclose angles of 45° with the direction of polarization 47 of the polarizer 22, the direction of polarization of one f the linearly plφthe the direction of polarization of one of the linearly polarized beams, denoted by 48, is parallel to that of the polarizer 22 and that of the other beam, denoted by 49, is at right angles to that of the polarizer 22. These beams impinge upon the polarizer 22. The beam 48 passes substantially unattenuated, the beam 49 is absorbed in the polarizer 22. After reflection at the reflector 23, the beam 51 is again passed by the polarizer 43. This beam, denoted by 52, is converted by the ¼ λ-plate 30 into a dextrorotary circularly polarized wave 53. In fact, the beam has traversed totally a ½ λ-plate; the levorotary wave 40 consequently is converted into a dextrorotary wave 53.

The phase difference between the dextrorotary wave 53 and the levorotary wave 40 is determined by the position of the reflector 23. This phase difference increases linearly with the axial displacement Δx of the reflector 23.

A part of the wave 53 enters the maser 21 through the maser mirror 31. This wave has the same rotations as the internal wave 38 and will impulse this wave; the operation of the optical maser 21 is most favorable if the wave 53 has the same phase as the wave 38. Now a phase relationship has arisen between the original waves 37 and 38. These show a phase difference which depends linearly on the displacement Δx of the reflector 23.

The combination of a levorotary and a dextrorotary circularly polarized wave which show a defined phase difference is a linearly polarized wave. The plane of polarization of said wave is established and is in a direct linear relationship with the said phase difference. Because the wave 38 is impulsed by external radiation but the wave 40 is not impulsed, the amplitudes of said waves will no longer be entirely equal. The active medium of the optical maser 21, however, ensures that no large amplitude difference will ocur. The emanating radiation consequently remains substantially linearly polarized.

Now the displacement of the reflector 23 can be measured continuously for direction and value from the rotation of the plane of polarization of the emitted radiation.

A preferred measuring method is the following: The radiation impinges through a dividing mirror 26 on two polarizers 24 and 25 the planes of polarization of which enclose an angle of 45°. The radiation path is detected by means of the photoelectric cells 27 and 28.

In FIG. 4, A is the amplitude of the radiation impinging upon the polarizers 24 and 25 through the division mirror 26. The direction of the planes of polarization is denoted by the lines 61 and 62. The angle Ψ is proportional to the displacement Δx of the reflector 23

$$\psi = 2\pi \frac{x}{\lambda}$$

(λ=the wavelength of the emitted radiation). The amplitude of the radiation passed by the polarizer 24 is $A_1$, that of the radiation passed by the polarizer 25 is $A_2$. When using quadratic detectors the signals observed are proportional to $A_1^2$ and $A_2^2$ respectively.

It can be proved that the geometrical positions of points with coordinates $A_1^2$ and $A_2^2$ is a circle with radius A. This circle is wholly traversed if Ψ has increased by 180°. In an embodiment, 21 was a He—Ne gas laser which emitted radiation having a wavelength λ=1.15μ. When the reflector 23 was displaced, 1/40 revolution of the circle with radius A could easily be read on an oscillograph. This means a displacement of approximately 150 AU of the reflector 23.

What is claimed is:

1. A device for determining the displacement of a movable reflecting object comprising, a substantially isotropic optical maser including an active radiating medium for producing a polarized beam having an indefinite plane of polarization, said maser optically enclosed by two opposed reflecting members, said movable reflecting object being positioned in the radiation path of said beam, substantially anisotropic polarizing means for determining the plane of polarization of said beam disposed intermediate said movable reflecting object and one of said opposed reflecting members, and photo detecting means including a polarizing element optically coupled to said beam and responsive to the variation in the plane of polarization produced by movement of said reflecting object for producing a signal representation of said movement.

2. The combined of claim 1 wherein said substantially anisotropic means includes a polarizer.

3. The combination of claim 1 wherein said substantially anisotropic means includes a n/4λ plate wherein n is any odd integer.

4. The combination of claim 1 wherein said substantially anisotropic means includes a polyarizer and an n/4λ plate, wherein n is any odd integer.

5. The combined of claim 4 wherein said plate is optically positioned at an angle of substantially 45° with the direction of polarization of said polarizer.

6. A device for determining the displacement of a movable reflecting object comprising, a substantially isotropic optical maser including an active radiating medium optically enclosed by at least two opposed mirror members for producing substantially linearly polarized optical radiation having an indefinitely oriented plane of polarization, said movable reflecting object being positioned in the radiating path of said active medium, adjacent to one of said mirror members, a substantially anisotropic means, including a polarizer and an n/4 plate wherein $n$ is any odd integer, disposed along said radiating path intermediate said movable reflecting object and said one of said mirror members, optical dividing means disposed along said radiating path adjacent the other of said mirror members for dividing said radiation into two sub paths, photo detection means for measuring the resultant radiation intensity in each of said sub paths, and first and second sub path polarizers each disposed intermediate said optical dividing means and said photo detection means in a respective sub path.

References Cited

UNITED STATES PATENTS 3,409,370   11/1968   King et al. _____ 356—107

RONALD L. WIBERT, Primary Examiner

W. L. SIKES, Assistant Examiner

U.S. Cl. X.R.

331—94.5

UNITED STATES PATENT OFFICE
CERTIFICATE OF CORRECTION

Patent No. 3,514,207     Dated May 26, 1970

Inventor(s) HENDRIK DE LANG ET AL

It is certified that error appears in the above-identified patent and that said Letters Patent are hereby corrected as shown below:

Column 3, line 43, cancel "the direction of polarization of one f the linearly pl $\varphi$ the";

Signed and sealed this 20th day of October 1970.

(SEAL)
Attest:

Edward M. Fletcher, Jr.
Attesting Officer

WILLIAM E. SCHUYLER, JR.
Commissioner of Patents